(12) United States Patent
Namuduri et al.

(10) Patent No.: US 11,901,844 B1
(45) Date of Patent: Feb. 13, 2024

(54) ELECTRIC MOTOR CONTROL

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US); Norman K. Bucknor, Troy, MI (US); Alireza Fatemi, Canton, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/895,366

(22) Filed: Aug. 25, 2022

(51) Int. Cl.
*B60L 50/51* (2019.01)
*H02P 23/02* (2006.01)
*H02P 23/14* (2006.01)
*B60L 15/20* (2006.01)

(52) U.S. Cl.
CPC .......... *H02P 23/02* (2013.01); *B60L 15/2045* (2013.01); *H02P 23/14* (2013.01); *B60L 2240/12* (2013.01); *B60L 2240/423* (2013.01)

(58) Field of Classification Search
CPC .. B60L 50/51; B60L 15/2045; B60L 2240/12; B60L 2240/423; H02P 23/02; H02P 23/14
See application file for complete search history.

(56) References Cited

U.S. PATENT DOCUMENTS

| | | | |
|---|---|---|---|
| 2009/0107742 A1* | 4/2009 | Schulz | B60K 6/52 180/65.7 |
| 2016/0368388 A1* | 12/2016 | Kim | B60L 50/51 |

\* cited by examiner

*Primary Examiner* — Cortez M Cook
(74) *Attorney, Agent, or Firm* — CANTOR COLBURN LLP

(57) ABSTRACT

A method of controlling an electric motor of a vehicle includes monitoring torque command signals from a vehicle system to the electric motor, each torque command signal configured to cause the electric motor to output a commanded torque, and monitoring a speed of the vehicle and an output torque of the electric motor, the output torque responsive to a drive signal generated based on the torque command signals. The method also includes, based on the output torque and the vehicle speed indicating a low motor efficiency condition, modulating the drive signal between a first torque value and a second torque value that is less than the first torque value, the first torque value greater than the commanded torque and selected to increase an efficiency of the electric motor.

20 Claims, 8 Drawing Sheets

ELECTRIC MOTOR CONTROL

INTRODUCTION

The subject disclosure relates to control of electric motors, and more specifically, to modulation of electric motor control signals.

Electric vehicles (EV) and hybrid electric vehicles (HEV) (i.e., electrified vehicles) may include an electric propulsion system including one or more electric drive units having an electric traction motor. Popular motor control methodologies include field oriented control and direct torque control. Various factors contribute to the range of an EV, such as battery capacity, weight and drive system efficiency.

SUMMARY

In one exemplary embodiment, a method of controlling an electric motor of a vehicle includes monitoring torque command signals from a vehicle system to the electric motor, each torque command signal configured to cause the electric motor to output a commanded torque, and monitoring a speed of the vehicle and an output torque of the electric motor, the output torque responsive to a drive signal generated based on the torque command signals. The method also includes, based on the output torque and the vehicle speed indicating a low motor efficiency condition, modulating the drive signal between a first torque value and a second torque value that is less than the first torque value, the first torque value greater than the commanded torque and selected to increase an efficiency of the electric motor.

In addition to one or more of the features described herein, the low motor efficiency condition corresponds to the commanded torque being less than or equal to a selected threshold.

In addition to one or more of the features described herein, the low motor efficiency condition corresponds to the commanded torque being a proportion of a maximum motor torque at a constant vehicle speed, the proportion less than or equal to a predetermined threshold.

In addition to one or more of the features described herein, the predetermined threshold is about 0.2.

In addition to one or more of the features described herein, the drive signal is modulated to maintain an average torque that is within a selected range of the commanded torque.

In addition to one or more of the features described herein, the drive signal is a pulse width modulation (PWM) signal, and the modulation includes controlling at least one of a duty cycle and an amplitude of the PWM signals.

In addition to one or more of the features described herein, the modulation is performed by controlling a frequency of the drive signal.

In addition to one or more of the features described herein, the modulation includes controlling the frequency based on a current vehicle speed.

In another exemplary embodiment, a motor control device includes a controller connected to an electric motor of a vehicle. The controller is configured to monitor torque command signals from a vehicle system to the electric motor, each torque command signal configured to cause the electric motor to output a commanded torque, and monitor a speed of the vehicle and an output torque of the electric motor, the output torque responsive to a drive signal generated based on the torque command signals. The controller is also configured to, based on the output torque and the vehicle speed indicating a low motor efficiency condition, modulate the drive signal between a first torque value and a second torque value that is less than the first torque value, the first torque value greater than the commanded torque and selected to increase an efficiency of the electric motor.

In addition to one or more of the features described herein, the low motor efficiency condition corresponds to the commanded torque being less than or equal to a selected threshold.

In addition to one or more of the features described herein, the low motor efficiency condition corresponds to the commanded torque being a proportion of a maximum motor torque at a constant vehicle speed, the proportion less than or equal to a predetermined threshold.

In addition to one or more of the features described herein, the predetermined threshold is about 0.2.

In addition to one or more of the features described herein, the drive signal is modulated to maintain an average torque that is within a selected range of the commanded torque.

In addition to one or more of the features described herein, the drive signal is a pulse with modulation (PWM) signal, and the modulation includes controlling at least one of a duty cycle and an amplitude of the PWM signals.

In addition to one or more of the features described herein, the modulation is performed by controlling a frequency of the drive signal.

In addition to one or more of the features described herein, the modulation includes controlling the frequency based on a current vehicle speed.

In yet another exemplary embodiment, a vehicle system includes a memory having computer readable instructions, and a processing device for executing the computer readable instructions, the computer readable instructions controlling the processing device to perform a method. The method includes monitoring torque command signals to an electric motor of a vehicle, each torque command signal configured to cause the electric motor to output a commanded torque, and monitoring a speed of the vehicle and an output torque of the electric motor, the output torque responsive to a drive signal generated based on the torque command signals. The method also includes, based on the output torque and the vehicle speed indicating a low motor efficiency condition, modulating the drive signal between a first torque value and a second torque value that is less than the first torque value, the first torque value greater than the commanded torque and selected to increase an efficiency of the electric motor.

In addition to one or more of the features described herein, the drive signal is modulated to maintain an average torque that is within a selected range of the commanded torque.

In addition to one or more of the features described herein, the drive signal is a pulse with modulation (PWM) signal, and the modulation includes controlling at least one of a duty cycle and an amplitude of the PWM signals.

In addition to one or more of the features described herein, the modulation includes controlling a frequency of the drive signal based on a current vehicle speed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
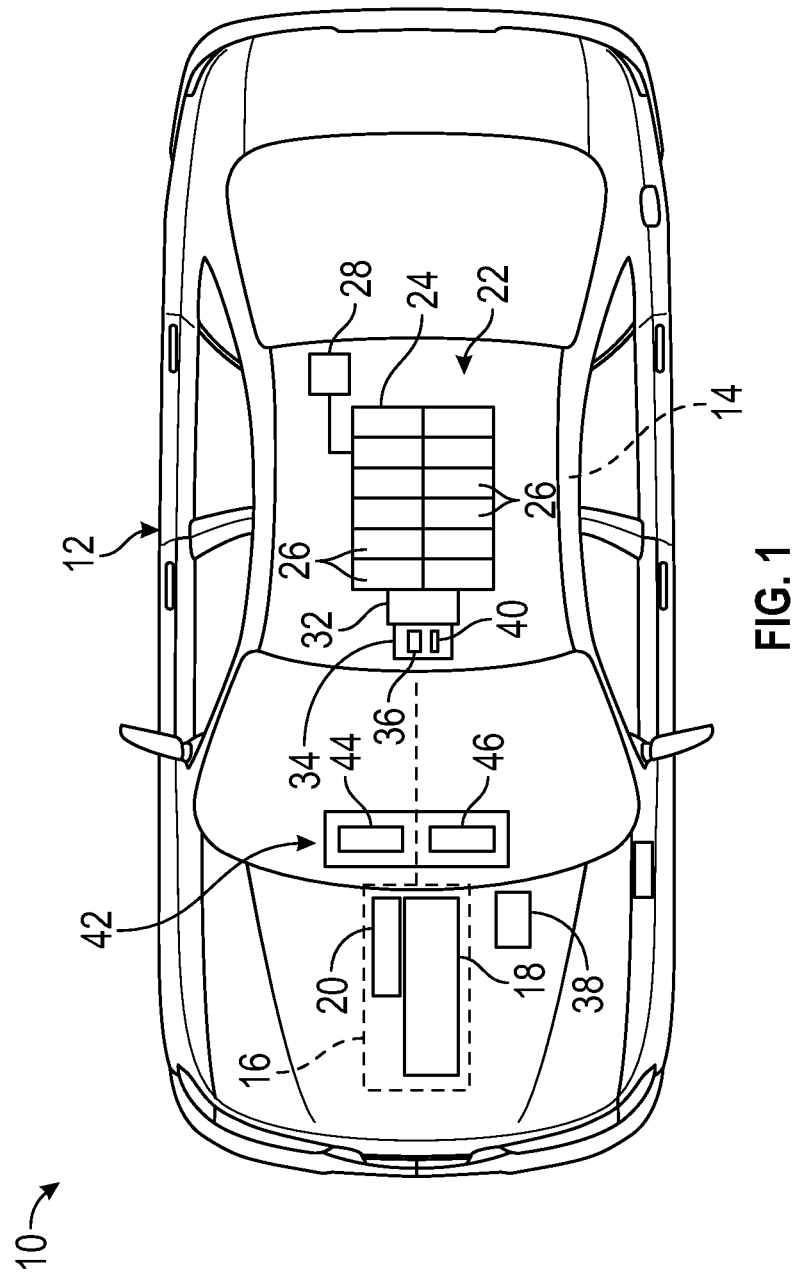
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for electric motor control. An embodiment of a control system includes a controller configured to monitor torque commands from a vehicle controller and corresponding drive signals to an electric motor, and dynamically modulate the drive signals to increase efficiency and/or affect noise and vibration. In an embodiment, the dynamic modulation is performed during a low efficiency condition, which may be a condition in which the torque command prescribes a torque level associated with low efficiency, such as no torque or torque below a selected threshold. Drive signals for a commanded torque may be modulated by varying modulation parameters such as frequency, magnitude and/or duty cycle. For example, a drive signal prescribing a commanded torque is modulated between a maximum torque value (e.g., a torque value higher than the commanded torque and associated with higher efficiency) and a minimum torque (e.g., zero torque) in order to maintain an average torque at or near the commanded torque.

Embodiments described herein present numerous advantages and technical effects. The embodiments provide for increased efficiency in vehicle propulsion, for example, under conditions in which motor torque efficiencies are typically lower. Such increased efficiency contributes to improved range for electric vehicles, and improved fuel economy for hybrid vehicles. In addition, increases in efficiency are achievable without significant effects on driving speed and smoothness.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be an electrically powered vehicle (EV) or a hybrid vehicle. In an embodiment, the vehicle 10 is a hybrid vehicle that includes a combustion engine assembly 18 and at least one electric motor assembly. In this embodiment, the propulsion system 16 includes an electric motor 20, and may include one or more additional motors positioned at various locations.

The vehicle 10 includes a battery system 22, which may be electrically connected to the motor 20 and/or other components, such as vehicle electronics. The battery system 22 may be configured as a rechargeable energy storage system (RESS). In an embodiment, the battery system 22 includes a battery assembly such as a high voltage battery pack 24 having a plurality of battery modules 26. The battery system 22 may also include a monitoring unit 28 that includes components such as a processor, memory, an interface, a bus and/or other suitable components.

The battery system 22 is electrically connected to components of the propulsion system 16. The propulsion system also includes a DC-DC converter module 32 and an inverter module 34. The inverter module 34 (e.g., a traction power inverter unit or TPIM) converts direct current (DC) power from the battery assembly to poly-phase alternating current (AC) power (e.g., three-phase, six-phase, etc.) to drive the motor 20. In an embodiment, the inverter module 34 includes an inverter 36 connected to the DC-DC-converter module 32 for receiving DC power, and is connected to the motor 20 for providing poly-phase AC power thereto.

The propulsion system 16 includes or is connected to a vehicle controller 38 that provides torque commands to a motor controller 40. The motor controller 40 may be part of the inverter module 34 or may be a separate module or unit.

The vehicle 10 also includes a computer system 42 that includes one or more processing devices 44 and a user interface 46. The various processing devices and units may communicate with one another via a communication device or system, such as a controller area network (CAN) or transmission control protocol (TCP) bus.

Figure 2:
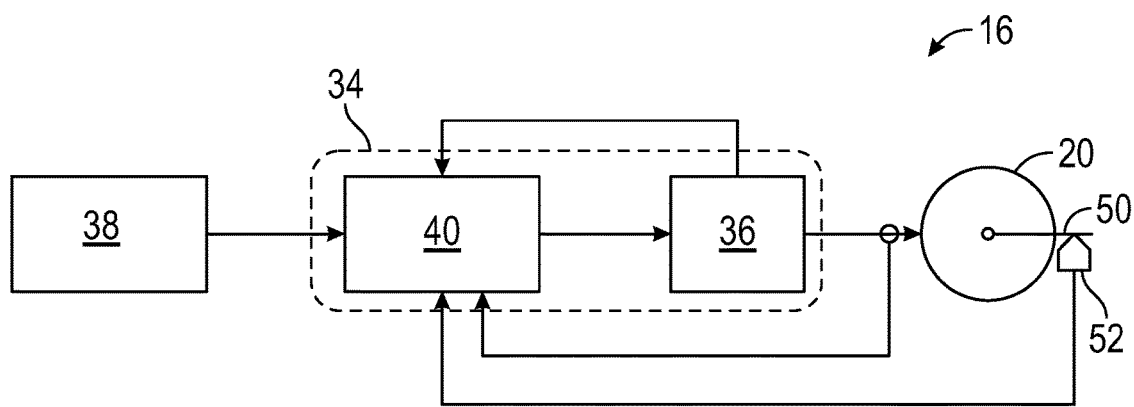
FIG. 2 schematically depicts components of a propulsion system, in accordance with an exemplary embodiment.

FIG. 2 schematically depicts components of the inverter module 34 and the propulsion system 16. The motor 20 include a motor output shaft 50 and sensors 52, for example to detect rotor/output shaft position. The motor output shaft 50 transfers torque between the motor 20 and driveline components (not shown). Propulsion torque requests or commands may be provided by the vehicle controller 38 or other component or unit (e.g., the computer system 42) to the motor controller 40.

The motor 20, in an embodiment, is a three-phase AC motor receiving three-phase AC power over a motor control power bus. The inverter 36 includes a plurality of solid-state switches such as IGBTs and power MOSFETs. The inverter 34 electrically connects to stator phase windings of the motor 20, and controls the switches to generate drive signals in response to torque commands. As noted, the motor 20 is not limited to three-phases, and may have any number of phases.

The inverter 34 may employ any suitable pulse width modulation (PWM) control, for example sinusoidal pulse width modulation (SPWM) or space vector pulse width modulation (SVPWM), to generate switching signals to convert stored DC power from the battery pack 24 to AC electric power to drive the motor 20 to generate torque. Control of the inverter 34 may include high frequency switching of the solid-state switches in accordance with the PWM control.

The motor controller 40 or other suitable processing device or system is configured to control drive signals to the inverter 36 in order to increase efficiency of the motor 20 under various conditions. In an embodiment, the motor controller 40 modulates the drive signals according to a dynamic torque modulation (DTM) strategy in low efficiency conditions (e.g., low load during constant vehicle speed). The DTM modulates the drive signals between a first torque that is higher than a commanded torque and a second torque that is lower than the commanded torque, in order to increase efficiency while maintaining an average torque that corresponds to the commanded torque. The first torque may be a torque value associated with higher efficiency conditions. A "low efficiency condition" is a condition in which there is no load or a low load on the motor (e.g., during vehicle motion).

Figure 3:
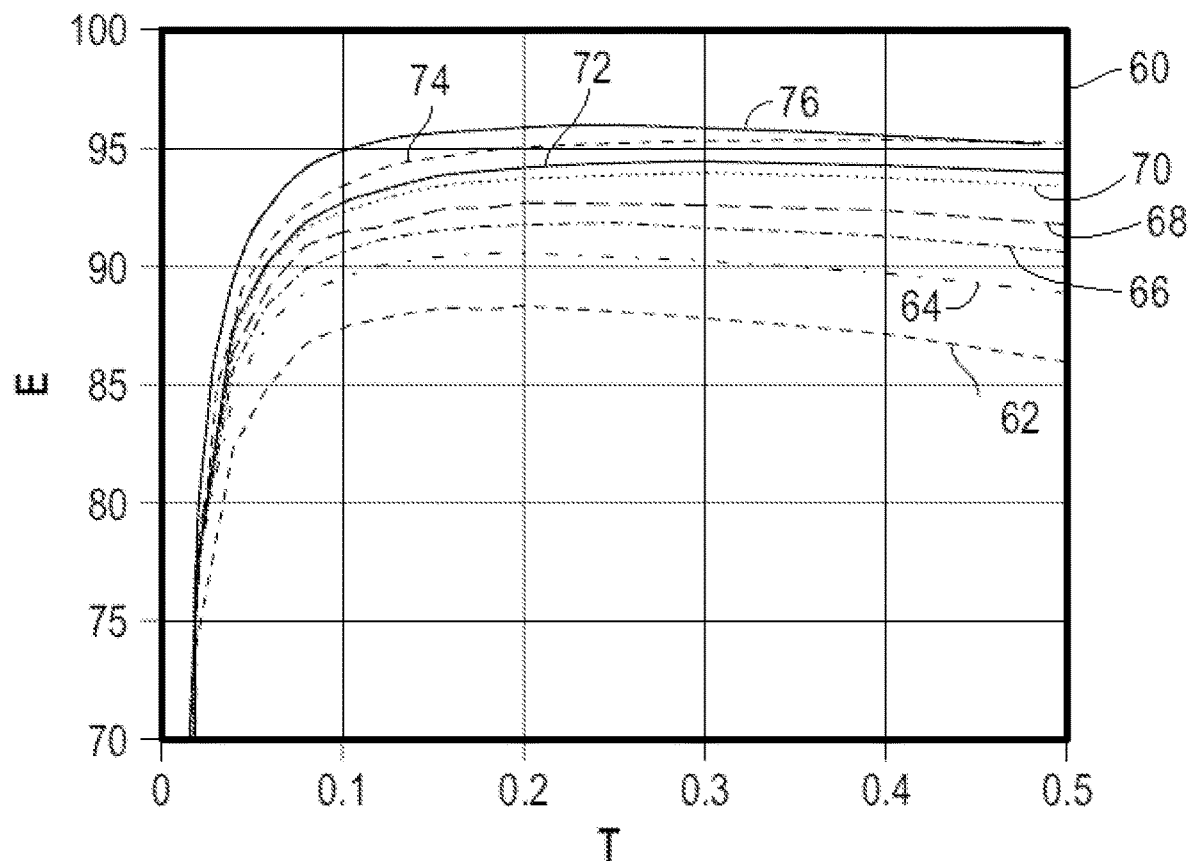
FIG. 3 depicts examples of motor efficiency at various vehicle speeds.

FIG. 3 depicts a graph 60 of drive system efficiency of a vehicle as a function of motor torque for multiple vehicle speeds, and illustrates examples of low efficiency conditions. The graph 60 relates torque output (7) in Newton-meters (Nm) and efficiency (E), expressed as output power as a percentage of input power, for a plurality of vehicle speeds $N_i$, where i=0,1 . . . n. Curves 62, 64, 66, 68, 70, 72, 74 and 76 correspond to efficiency curves for speeds N1, N2, N3, N4, N5, N6, N7 and Nn, respectively. Each curve corresponds to a successively higher speed (i.e., Nn>. . . N2>N1).

As shown, for a given vehicle speed, the drive system efficiency increases with torque and reaches a peak at around 0.2 p.u. (p.u. is a proportionality unit that represents the torque as a percentage of the motor's maximum output torque). For loads above about 0.2 p.u., the efficiency flattens, and the efficiency drops steeply for torque levels below about 0.1 p.u. As discussed herein, by modulating a commanded torque using a torque associated with greater motor efficiency, the drive system efficiency at the given motor speed can be increased without affecting vehicle speed or adding significant noise, and while maintaining driving smoothness.

For example, if a commanded torque of 0.2 p.u. or less is received by the controller 40 at vehicle speed $N_i$, the motor controller 40 may modulate the corresponding drive signal between a maximum torque ($T_{max}$) and a minimum torque ($T_{min}$) so that the average torque is at or near the commanded torque. $T_{max}$ be a torque value from a higher efficiency level (e.g., a level of torque that would be used at the higher speed $N_i$).

Figure 4:
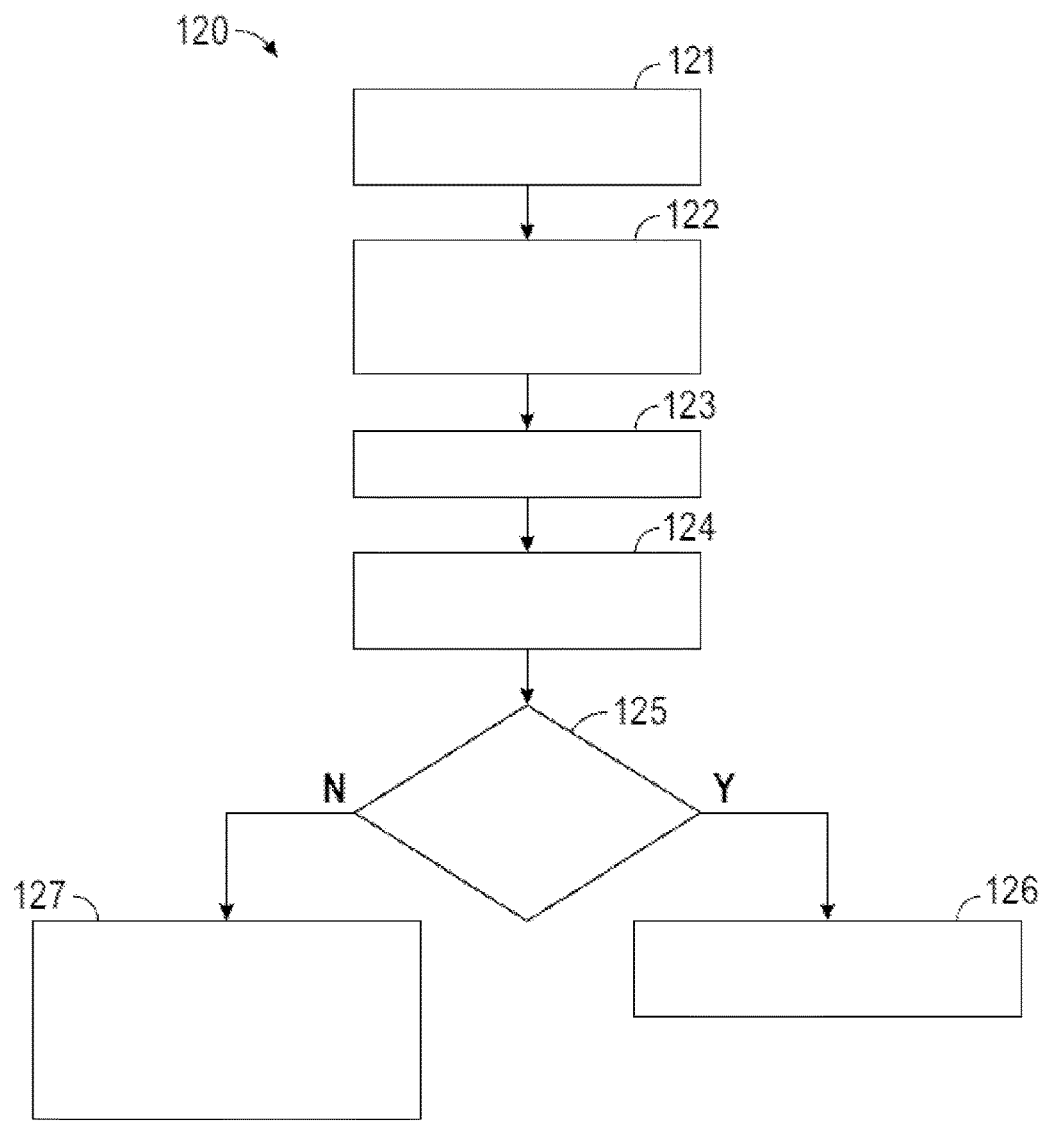
FIG. 4 is a flow diagram depicting aspects of a method of motor control using dynamic torque modulation, in accordance with an exemplary embodiment.

FIG. 4 illustrates embodiments of a method 120 of controlling an electric motor and modulating drive signals to increase motor and drive system efficiency. The method 120 may be performed in conjunction with the vehicle 10 and the propulsion system 16. However, the method 120 is not so limited and may be used with any suitable electric motor drive system. Aspects of the method 120 may be performed by a suitable processing device or combination of processing devices.

The method 120 includes a number of steps or stages represented by blocks 121-127. The method 120 is not limited to the number or order of steps therein, as some steps represented by blocks 121-127 may be performed in a different order than that described below, or fewer than all of the steps may be performed.

At block 121, low efficiency conditions for an electric motor and/or electric drive system of a vehicle are identified. For example, efficiency data for the motor 20 (or similar motors, such as motors of the same type) at various torque levels and vehicle speeds are calculated or acquired to determine conditions of low efficiency.

At block 122, an optimal torque threshold and optimal torque range is determined for a given low efficiency condition. The optimal torque range includes a maximum torque $T_{max}$ that is greater than a commanded torque level associated with the low efficiency condition. In addition, a minimum torque $T_{min}$ is selected, which may be zero or another value lower than the commanded torque level. In an embodiment, the maximum torque $T_{max}$ and the minimum torque $T_{min}$ are selected such that modulation between these two values can be configured to maintain an average torque that corresponds to (i.e., is equal to or within a desired range of) the commanded torque level.

In an embodiment, the maximum torque $T_{max}$ is defined based on the commanded torque level. For example, if a commanded torque corresponds to a low efficiency condition (e.g., low torque at high vehicle speed), the maximum torque $T_{max}$ may be selected based on a proportion of the commanded torque.

Referring to the example of FIG. 3, torque efficiency is determined to fall at about 0.2 p.u. Accordingly, the optimal torque threshold is selected to be about 2.0 p.u., and the maximum torque $T_{max}$ is selected to be above 0.2 p.u.

The maximum torque $T_{max}$ and the minimum torque T min may be some percentage of a commanded torque in a low efficiency condition. For example, the maximum torque is 150% of the commanded torque and the minimum torque is 50% of the commanded torque. The maximum and minimum torques can be any desired values relative to commanded torque and is not limited to any examples described herein.

At block 123, the vehicle (e.g., the vehicle 10) is operated. At block 124, vehicle speed and drive system parameters are monitored and input to a processing device (e.g., the controller 40). Torque commands (e.g., from the vehicle controller 38) are monitored.

At block 125, if the vehicle speed is a speed in which a low efficiency condition may occur, the torque commands are compared to an optimal torque threshold (e.g., 0.2 p.u. in the example of FIG. 3).

At block 126, if the commanded torque is above the threshold, no torque modulation is needed and the processing device continues to monitor vehicle speed and drive system parameters.

At block 127, if the commanded torque is less than or equal to the threshold, the corresponding drive signal is modulated to generate a modulated torque signal. The drive signal may be modulated within a range ($\Delta T_{modulation}$) between the maximum torque $T_{max}$ and the minimum torque $T_{min}$, such that an average torque ($T_{average}$) is the same as (or within a range of) the commanded torque. $T_{max}$ and $T_{min}$ are chosen to achieve the lowest possible drive system loss for a given $T_{average}$.

Figure 5:
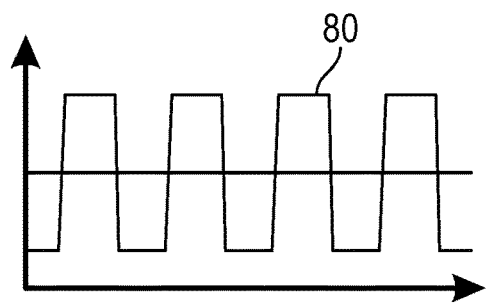
FIG. 5 depicts an example of a modulation applied to a drive signal.

FIG. 5 depicts an example of a modulated drive signal 80 generated by the controller 40 and applied to the motor 20. In this example, the maximum torque $T_{max}$ is a torque level that is higher than a commanded torque and corresponds to a torque associated with a higher efficiency condition, and the minimum torque $T_{min}$ is close to zero. The frequency and/or the duty cycle of the modulated drive signal 80 may be selected to reduce noise vibration harshness (NVH) to be within desired levels.

Modulation as described herein is not limited to efficiency increase and noise reduction. In an embodiment, the modulation can be applied to generate a desired audible noise signature. For example, drive signals can be modulated to generate a noise signature that emulates the sound of a combustion vehicle.

Figure 6A:
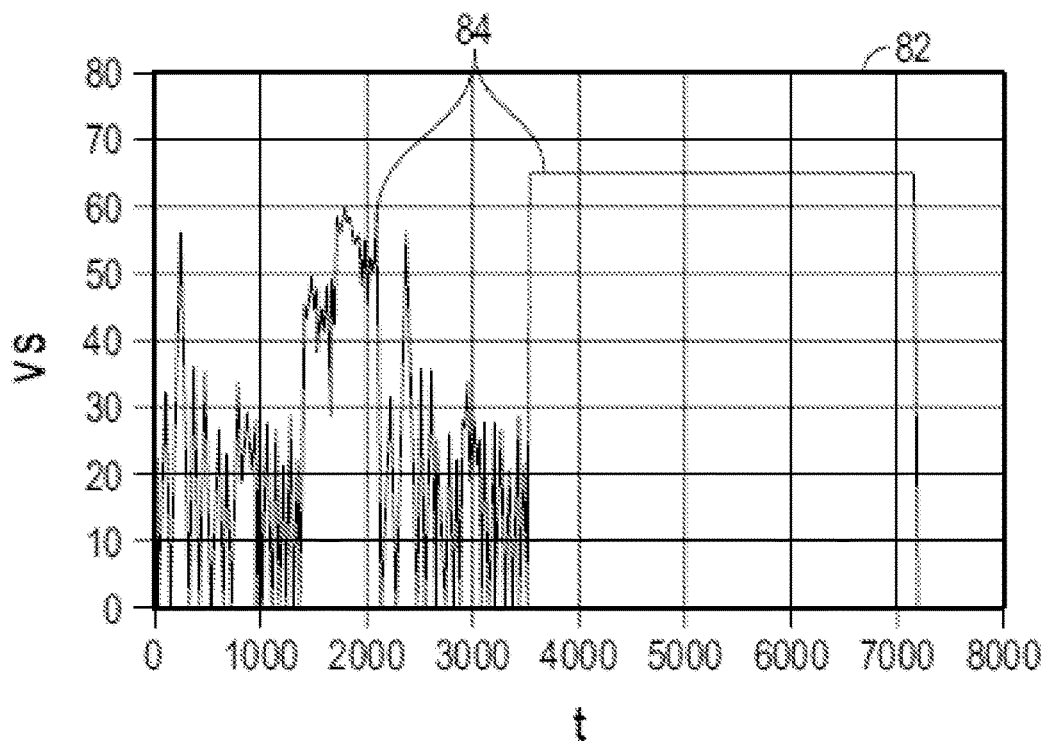
FIGS. 6A and 6B depict motor torque and vehicle speed characteristics of a vehicle during a trip, and illustrates examples of low efficiency conditions.
Figure 6B:
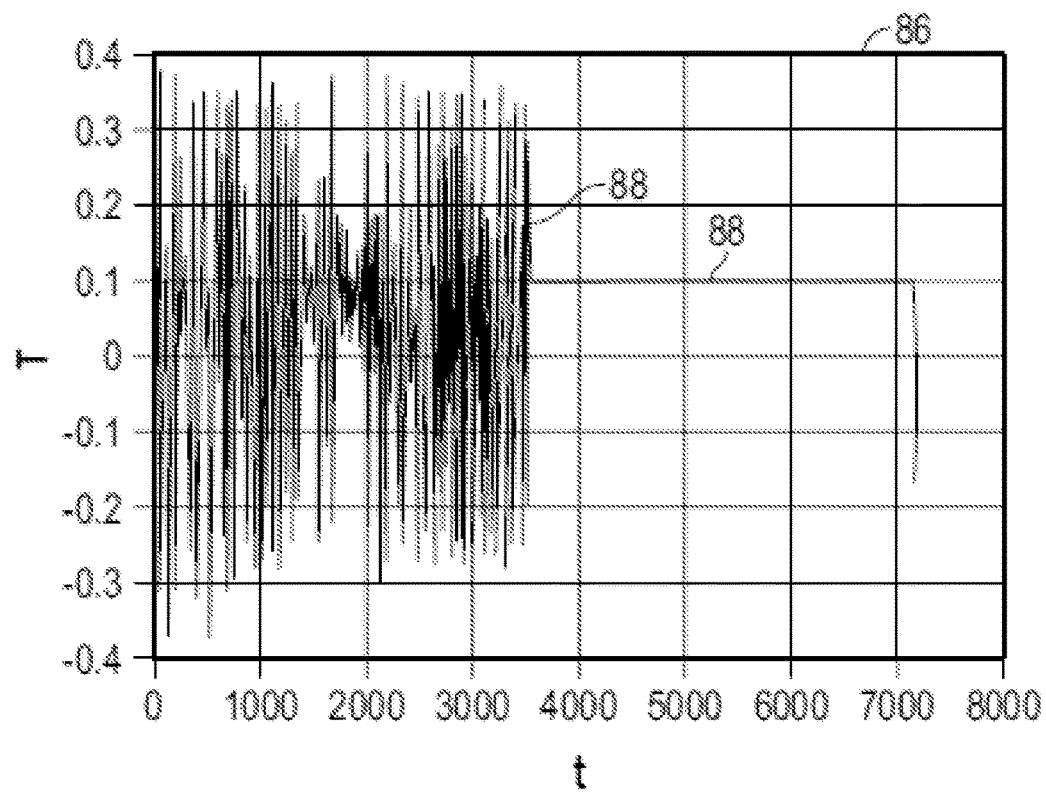

FIGS. 6A and 6B depict an example of operation of an electric vehicle including the drive system discussed in conjunction with FIG. 3. FIGS. 6A and 6B illustrate the occurrence of low efficiency conditions at which dynamic modulation can be performed to increase efficiency. FIG. 6A is a graph 82 including a curve 84 that shows vehicle speed (VS) in miles per hour (mph) as a function of time (t) in seconds (s) over a time period. FIG. 6B is a graph 86 including a curve 88 that shows motor torque (7) in p.u. over the same time period.

As can be seen, the motor torque T stays below about 0.2 p.u. for a significant portion of the time period. In addition, when the vehicle maintains a speed of about 65 mph, the torque stays below about 0.1 p.u., representing a period of time during which motor efficiency becomes very low (as shown in FIG. 3). Dynamic torque modulation may be applied during time windows in which the torque is below the 0.2 p.u. level. For example, when the vehicle speed is at 65 mph, dynamic torque modulation is performed, where the maximum torque $T_{max}$ is a torque level associated with torque applied at a higher speed at which efficiency is higher, and the minimum $T_{min}$ is at zero or at a level that maintains the average torque at about a commanded torque.

Figure 7:
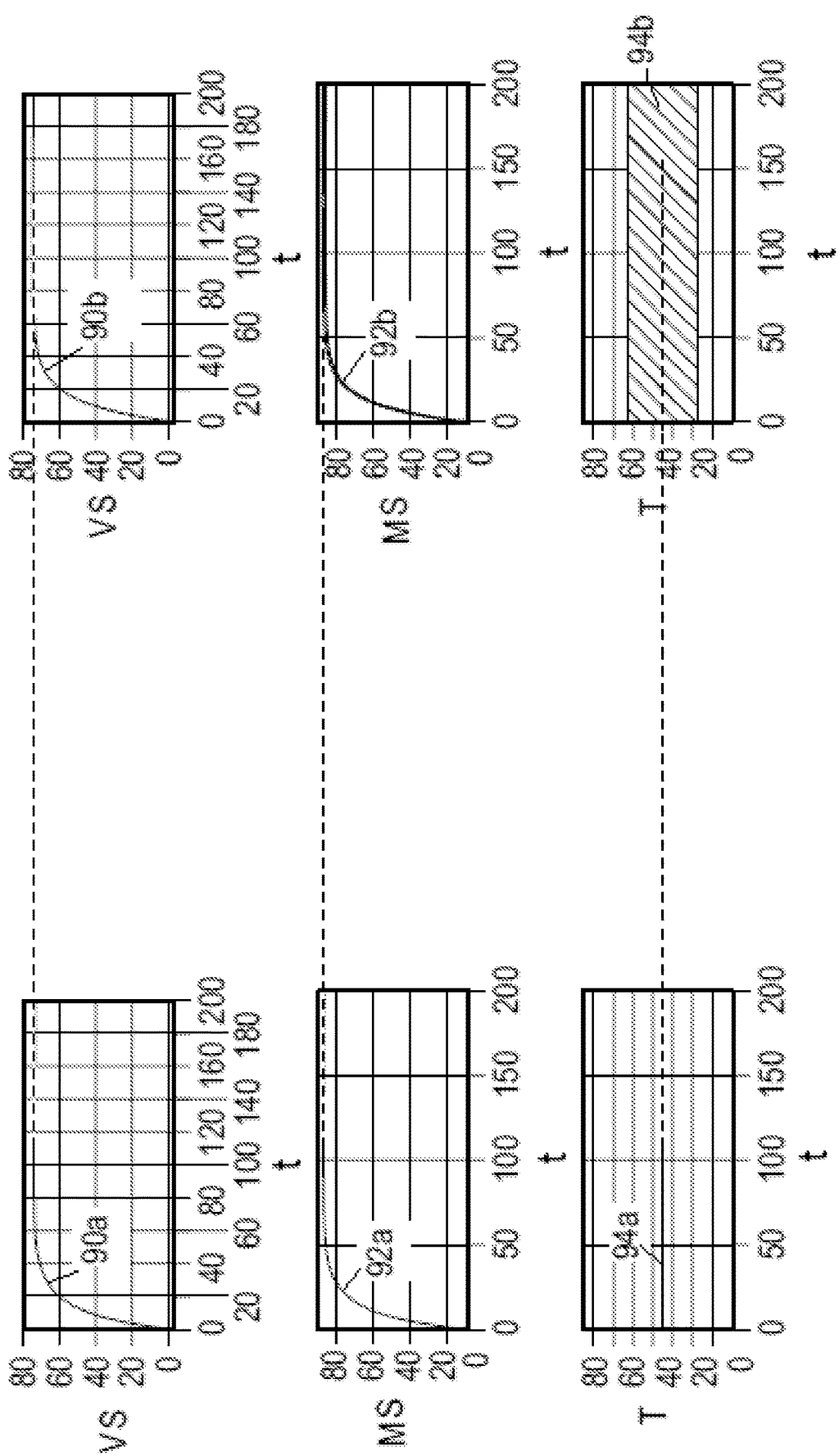
FIG. 7 depicts a comparison of motor control using a conventional control method and motor control using the method of FIG. 4.
Figure 8:
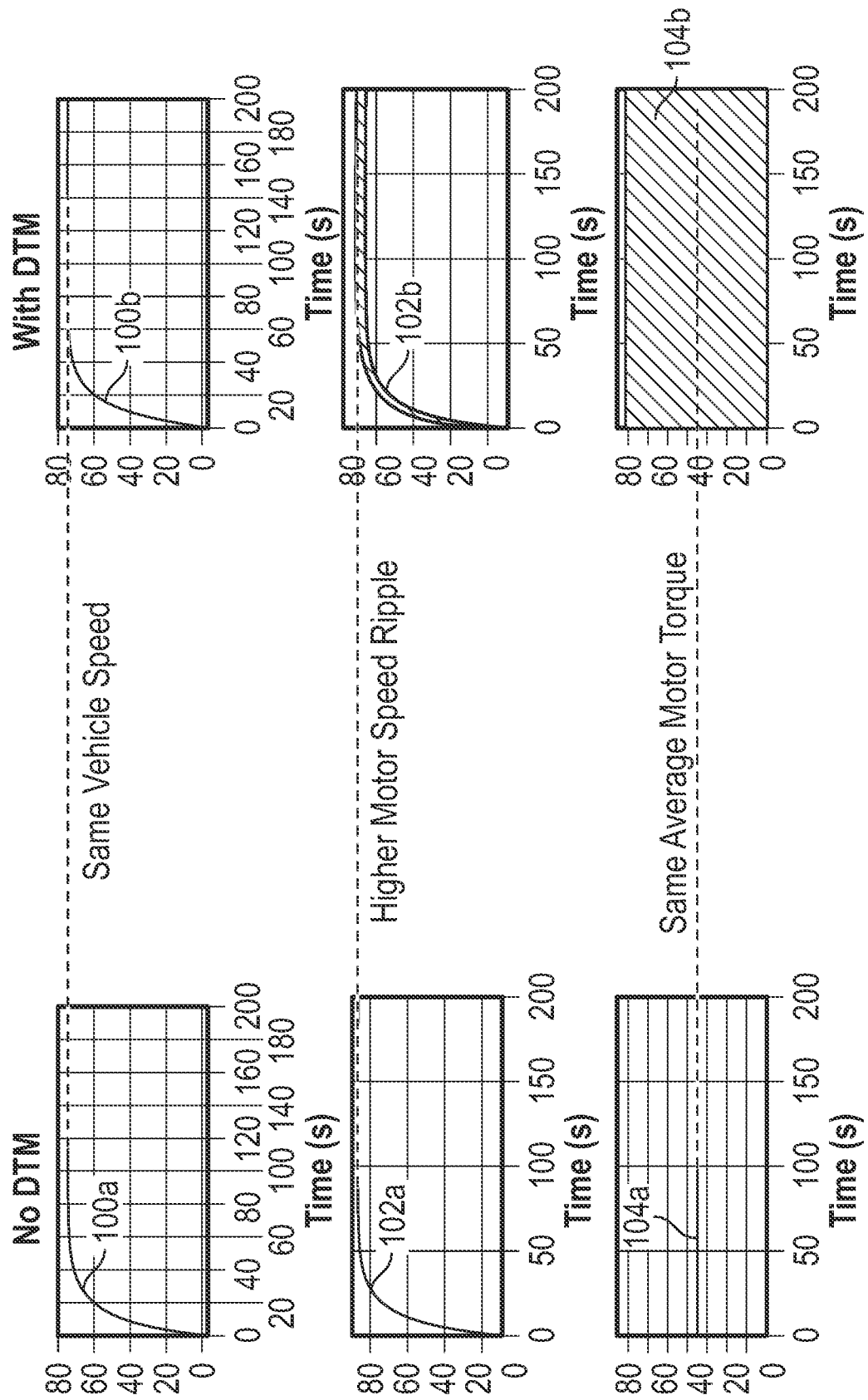
FIG. 8 depicts a comparison of motor control using a conventional control method and motor control using the method of FIG. 4.
Figure 9:
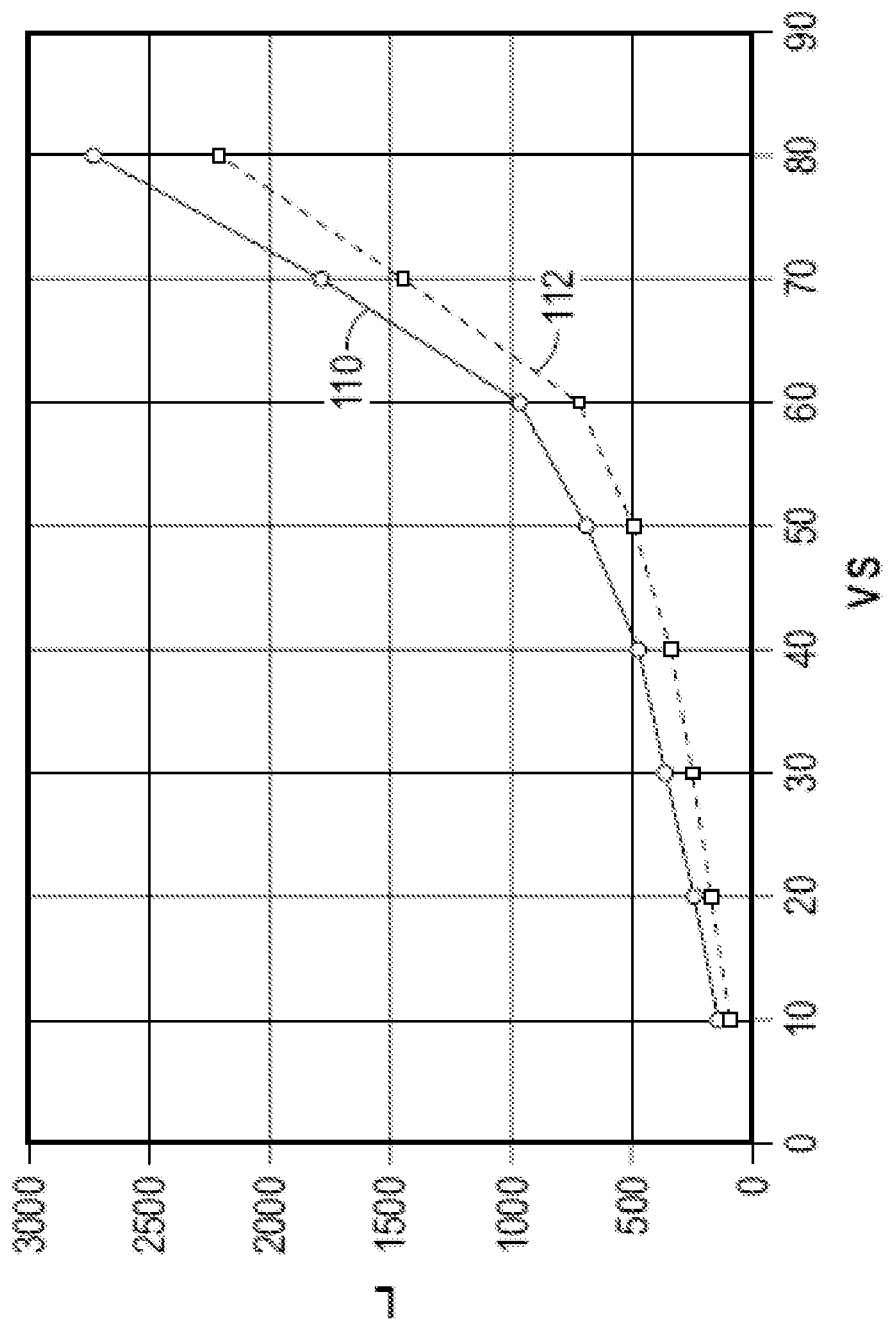
FIG. 9 depicts a comparison of drive system losses using a conventional control method as compared to using the method of FIG. 4.

FIGS. 7-9 illustrate examples of the method 120 and results thereof, and demonstrate the ability of the method 120 to increase efficiency. FIG. 7 shows a first example, in which a drive signal was modulated at 100 Hz between 50% and 150% of a commanded torque (i.e., T min is 50% of the commanded torque and $T_{max}$ is 150% of the commanded torque), with a 50% duty cycle. Curve 90a shows vehicle speed (VS) as a function of time t, curve 92a shows motor speed (MS) in p.u. as a function of time and curve 94a shows motor torque (T) as a function of time for vehicle control that does not include dynamic torque modulation (DTM) as described herein. Curve 90b shows vehicle speed VS, curve 92b shows motor speed MS and curve 94b shows motor torque T as a result of using DTM. As shown, DTM results in the same vehicle speed and the same average torque. Although some ripple was introduced, the ripple did not affect the smoothness of the vehicle speed.

FIG. 8 shows a second example, in which a commanded torque was modulated at 100 Hz between 5% and 195% of the commanded torque with a 50% duty cycle. Curve 100a shows vehicle speed VS as a function of time t, curve 102a shows motor speed MS as a function of time and curve 104a shows motor torque T as a function of time for vehicle control that does not include DTM. Curve 100b shows vehicle speed VS, curve 102b shows motor speed MS and curve 104b shows motor torque T as a result of using DTM. Similar results can be seen, i.e., some ripple was introduced, but not enough to affect vehicle speed.

FIG. 9 shows results of another example, represented as total drive unit losses (L) in Watts (W) for a motor and inverter system for each of a plurality of constant vehicle speeds. Losses without DTM are shown by a curve 110 and losses with DTM are shown by a curve 112. As shown, there was a significant reduction in losses at every constant speed.

Figure 10:
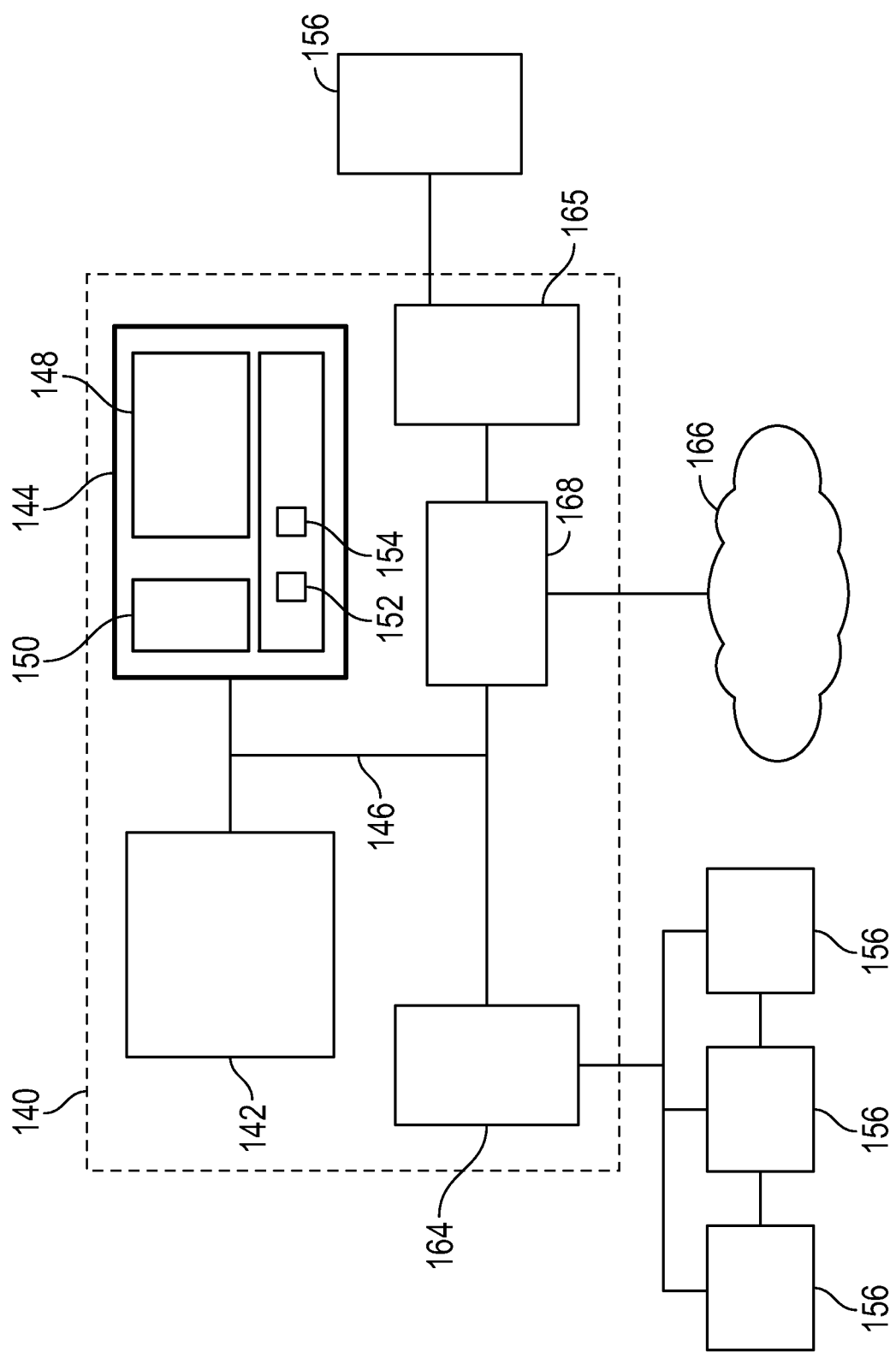
FIG. 10 depicts a computer system in accordance with an exemplary embodiment.

FIG. 10 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a drive system and vehicle controller, and a module 154 may be included to perform functions related to modulation of drive signals as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of controlling an electric motor of a vehicle, the method comprising:
    monitoring torque command signals from a vehicle system to the electric motor, each torque command signal configured to cause the electric motor to output a commanded torque;
    monitoring a speed of the vehicle and an output torque of the electric motor, the output torque responsive to a drive signal generated based on the torque command signals; and
    based on the output torque and the vehicle speed indicating a low motor efficiency condition, modulating the drive signal between a first torque value and a second torque value that is less than the first torque value, the first torque value greater than the commanded torque and selected to increase an efficiency of the electric motor.

2. The method of claim 1, wherein the low motor efficiency condition corresponds to the commanded torque being less than or equal to a selected threshold.

3. The method of claim 1, wherein the low motor efficiency condition corresponds to the commanded torque being a proportion of a maximum motor torque at a constant vehicle speed, the proportion less than or equal to a predetermined threshold.

4. The method of claim 3, wherein the predetermined threshold is about 0.2.

5. The method of claim 1, wherein the drive signal is modulated to maintain an average torque that is within a selected range of the commanded torque.

6. The method of claim 1, wherein the drive signal is a pulse width modulation (PWM) signal, and the modulation includes controlling at least one of a duty cycle and an amplitude of the PWM signals.

7. The method of claim 1, wherein the modulation is performed by controlling a frequency of the drive signal.

8. The method of claim 7, wherein the modulation includes controlling the frequency based on a current vehicle speed.

9. A motor control device, comprising:
    a controller connected to an electric motor of a vehicle, the controller configured to:
        monitor torque command signals from a vehicle system to the electric motor, each torque command signal configured to cause the electric motor to output a commanded torque;
        monitor a speed of the vehicle and an output torque of the electric motor, the output torque responsive to a drive signal generated based on the torque command signals; and
        based on the output torque and the vehicle speed indicating a low motor efficiency condition, modulate the drive signal between a first torque value and a second torque value that is less than the first torque value, the first torque value greater than the commanded torque and selected to increase an efficiency of the electric motor.

10. The device of claim 9, wherein the low motor efficiency condition corresponds to the commanded torque being less than or equal to a selected threshold.

11. The device of claim 9, wherein the low motor efficiency condition corresponds to the commanded torque being a proportion of a maximum motor torque at a constant vehicle speed, the proportion less than or equal to a predetermined threshold.

12. The device of claim 11, wherein the predetermined threshold is about 0.2.

13. The device of claim 9, wherein the drive signal is modulated to maintain an average torque that is within a selected range of the commanded torque.

14. The device of claim 9, wherein the drive signal is a pulse with modulation (PWM) signal, and the modulation includes controlling at least one of a duty cycle and an amplitude of the PWM signals.

15. The device of claim 9, wherein the modulation is performed by controlling a frequency of the drive signal.

16. The device of claim 15, wherein the modulation includes controlling the frequency based on a current vehicle speed.

17. A vehicle system comprising:
    a memory having computer readable instructions; and
    a processing device for executing the computer readable instructions, the computer readable instructions controlling the processing device to perform a method including:
        monitoring torque command signals to an electric motor of a vehicle, each torque command signal configured to cause the electric motor to output a commanded torque;
        monitoring a speed of the vehicle and an output torque of the electric motor, the output torque responsive to a drive signal generated based on the torque command signals; and
        based on the output torque and the vehicle speed indicating a low motor efficiency condition, modulating the drive signal between a first torque value and a second torque value that is less than the first torque value, the first torque value greater than the commanded torque and selected to increase an efficiency of the electric motor.

18. The vehicle system of claim 17, wherein the drive signal is modulated to maintain an average torque that is within a selected range of the commanded torque.

19. The vehicle system of claim 17, wherein the drive signal is a pulse with modulation (PWM) signal, and the modulation includes controlling at least one of a duty cycle and an amplitude of the PWM signals.

20. The vehicle system of claim 19, wherein the modulation includes controlling a frequency of the drive signal based on a current vehicle speed.

* * * * *